US012560222B2

(12) United States Patent
Gorantla Narayana Murthy

(10) Patent No.: US 12,560,222 B2
(45) Date of Patent: Feb. 24, 2026

(54) METHOD FOR PERFORMING ROTATIONAL SPEED SYNCHRONISATION

(71) Applicant: Ningbo Geely Automobile Research & Development Co., Ltd., Ningbo (CN)

(72) Inventor: Sri Vishnu Gorantla Narayana Murthy, Gothenburg (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 583 days.

(21) Appl. No.: 17/733,704

(22) Filed: Apr. 29, 2022

(65) Prior Publication Data

US 2022/0260137 A1      Aug. 18, 2022

Related U.S. Application Data

(63) Continuation of application No. PCT/CN2020/124242, filed on Oct. 28, 2020.

(30) Foreign Application Priority Data

Nov. 21, 2019      (EP) ..................................... 19210681

(51) Int. Cl.
*F16H 3/12*          (2006.01)
*B60L 15/20*          (2006.01)
(Continued)

(52) U.S. Cl.
CPC .......... *F16H 3/126* (2013.01); *B60L 15/2054* (2013.01); *B60L 53/20* (2019.02); *F16H 61/684* (2013.01)

(58) Field of Classification Search
CPC .... F16H 3/126; F16H 61/684; F16H 61/0403; F16H 2061/0422; F16H 61/04; B60L 15/2054; B60L 53/20
See application file for complete search history.

(56) References Cited

U.S. PATENT DOCUMENTS 5,675,222  A      10/1997  Fliege
9,963,151  B2      5/2018  Nilsson
(Continued)

FOREIGN PATENT DOCUMENTS

CN          101412369  A      4/2009
CN          201390152  Y      1/2010
(Continued)

OTHER PUBLICATIONS

International Search Report from corresponding International Application No. PCT/CN2020/124242, mailed on Jan. 28, 2021, 2 pages.

*Primary Examiner* — Jason Holloway
*Assistant Examiner* — Elizabeth Rose Neleski
(74) *Attorney, Agent, or Firm* — Tucker Ellis LLP

(57)          ABSTRACT

A method for performing rotational speed synchronisation of a first transmission component having a first initial rotational speed with a second transmission component having a second initial rotational speed, by means of a three-phase AC electric motor that is rotationally connected to the first transmission component, during a gear switch in a stepped gear transmission of a drive train having a switching mechanism enabling the stator windings of the AC electric motor to be selectively connected in star configuration or delta configuration. The method includes obtaining a command, or determining, that a gear switch should be performed; shifting the stator winding configuration of the AC electric motor to delta configuration, or ensuring that the stator winding configuration of the AC electric motor is in delta configuration; and controlling operation of the AC electric motor for accomplishing rotational speed synchronisation of the first and second transmission components.

14 Claims, 9 Drawing Sheets

(51) Int. Cl.
B60L 53/20 (2019.01)
F16H 61/684 (2006.01)

(56) References Cited

U.S. PATENT DOCUMENTS

| | | | | |
|---|---|---|---|---|
| 2004/0217723 A1* | 11/2004 | Cai | ..................... | F02N 11/0866 |
| | | | | 318/268 |
| 2011/0050136 A1* | 3/2011 | Sumi | ....................... | B60L 53/20 |
| | | | | 318/400.3 |
| 2012/0058855 A1 | 3/2012 | Sten | | |
| 2014/0285041 A1* | 9/2014 | Lankin | ................... | H02K 3/522 |
| | | | | 56/14.7 |
| 2016/0131229 A1* | 5/2016 | Hehenberger | ........ | F04D 25/163 |
| | | | | 475/198 |
| 2018/0106365 A1* | 4/2018 | Tsukizaki | ............ | F16H 61/0213 |
| 2018/0223989 A1* | 8/2018 | Bernard | .................... | G06F 9/06 |
| 2019/0113137 A1 | 4/2019 | Kvieska | | |
| 2019/0202281 A1 | 7/2019 | Cho | | |

FOREIGN PATENT DOCUMENTS

| | | | |
|---|---|---|---|
| CN | 106808988 A | 6/2017 |
| CN | 108367659 A | 8/2018 |
| DE | 102014018317 A1 | 6/2015 |
| JP | S63206195 A | 8/1988 |
| WO | 2009070089 A1 | 6/2009 |
| WO | 2016177392 A1 | 11/2016 |

* cited by examiner 12  34  6  19  25  18  32  7

12  34  6  19  25  18  32  7

METHOD FOR PERFORMING ROTATIONAL SPEED SYNCHRONISATION

RELATED APPLICATION DATA

This application is a continuation of International Patent Application No. PCT/CN2020/124242, filed Oct. 28, 2020, which claims the benefit of European Patent Application No. 19210681.3, filed Nov. 21, 2019, the disclosures of which are incorporated herein by reference in their entireties.

TECHNICAL FIELD

The present disclosure relates to a method for performing rotational speed synchronisation of a first transmission component having a first initial rotational speed with a second transmission component having a second initial rotational speed, by means of a three-phase AC electric motor. The disclosure further relates to an electrical powertrain system for a vehicle, wherein the electrical powertrain system comprises a three phase AC electric propulsion motor arranged for accomplishing rotational speed synchronisation of a first transmission component with and a second transmission component.

The method and system according to the disclosure can be arranged in a multi-stepped transmission of a vehicle, such as a car. However, the disclosure is not restricted to implementation in a car, but may alternatively be installed or implemented in another type of vehicle, such as a truck, a bus, an off-road vehicle, a mining vehicle, an agriculture vehicle, a working vehicle, a forest vehicle, a marine vessel, a motorcycle, or the like. Moreover, the method and system according to the disclosure can also be installed or implemented in stationary transmission installations, such as in industrial power train systems.

BACKGROUND

In the field of transmissions, in particular multi-stepped transmissions, there is a continuous demand for improved gear shifting performance, for example in terms of gear shift speed, gear shift smoothness, gear shift reliability, etc. One specific sequence of a gear shift involves rotational synchronisation of the transmissions parts that shall be rotationally connected during the gear shift.

One approach for accomplishing high speed rotational synchronisation is known from US2019113137A1, which shows synchronisation by the use of a three-phase electrical motor that is rotationally connected to a first transmission component. However, despite the activities in the field, there is still a demand for further improved gear shift performance.

SUMMARY

An object of the present disclosure is to provide a method and system that provides even faster rotational synchronisation during gear shifts using an electrical motor.

According to a first aspect of the present disclosure, there is provided a method for performing rotational speed synchronisation of a first transmission component having a first initial rotational speed with a second transmission component having a second initial rotational speed, by means of a three-phase AC electric motor that is rotationally connected to the first transmission component, during a gear switch in a stepped gear transmission of a drive train having a switching mechanism enabling the stator windings of the AC electric motor to be selectively connected in star configuration or delta configuration. The method comprises: obtaining a command, or determining, that a gear switch should be performed; shifting the stator winding configuration of the AC electric motor to delta configuration, or ensuring that the stator winding configuration of the AC electric motor is in delta configuration; and controlling operation of the AC electric motor for accomplishing rotational speed synchronisation of the first and second transmission components.

According to a second aspect of the present disclosure, there is provided an electrical powertrain system for a vehicle. The electrical powertrain system comprises an electrical storage system, an inverter, and a three phase AC electric propulsion motor drivingly connected to a wheel of the vehicle via a stepped gear transmission having a first transmission component and a second transmission component, wherein the AC electric motor is rotationally connected to the first transmission component. The electrical powertrain system further comprises a switching mechanism with a set of electrical switches for enabling the stator windings of the AC electric motor to be selectively connected in star or delta configuration, and a control unit for controlling operation of the switching mechanism, wherein the control unit is configured for: obtaining a command, or determining, that a gear switch should be performed; shifting the stator winding configuration of the AC electric motor to delta configuration, or ensuring that the stator winding configuration of the AC electric motor is in delta configuration; and subsequently controlling operation of the AC electric motor for accomplishing rotational speed synchronisation of the first and second transmission components.

By providing a powertrain system with a three-phase AC electric motor that is switchable between star and delta configuration, the higher phase voltage obtained in delta configuration may be used for generating higher electric motor output torque and thus even shorter synchronisation time period.

In some example embodiments, the step of shifting the stator winding configuration of the AC electric motor to delta configuration, or ensuring that the stator winding configuration of the AC electric motor is in delta configuration involves: checking current stator winding configuration; and shifting the stator winding configuration of the AC electric motor to delta configuration when the current stator winding configuration is star configuration, and remaining in delta configuration when the current stator winding configuration is in delta configuration. In other words, the shifting of winding configuration is only necessary when the AC electric motor is set in star connection before initiating the synchronisation process.

In some example embodiments, the AC electric motor is controlled in a scalar control mode during the rotational speed synchronisation of the first and second transmission components. This provides a simple and fast control mode that may be instantaneously initiated, which may be useful considering that a complete gear shift sequence typically is performed in less than 1 second, specifically in less than 0.5 seconds.

In some example embodiments, the AC electric motor is controlled in a vector control mode before and after the rotational speed synchronisation of the first and second transmission components. This provides an efficient and accurate control method of the AC electric motor.

In some example embodiments, at the end of said rotational speed synchronisation, the first and second transmission components rotates with an appropriate relative rotational speed suitable for enabling mutual rotational connection.

In some example embodiments, the method comprises controlling the switches of the inverter to remain in open state during operation of the switching mechanism for shifting the stator winding configuration of the AC electric motor from star configuration to delta configuration. Thereby, undesired current spikes caused by switching between star and delta connection is prevented from passing though the inverter switches.

In some example embodiments, the method comprises coordinating the operation of the switching mechanism for shifting the stator winding configuration of the AC electric motor from star configuration to delta configuration with the operating point of the AC electric motor for ensuring discharge of the phase inductor voltage of the AC electric motor before triggering said operation of the switching mechanism. Thereby, current spikes caused by inductance in the windings of the electrical motor is allowed to discharge and thus being prevented from interfere with the inverter, DC-link, battery, or the like.

In some example embodiments, the method comprises: providing the switching mechanism with a set of electrical switches for enabling the stator windings of the AC electric motor to be selectively connected in star or delta configuration; and shifting all switches of said set substantially simultaneously with shifting the stator winding configuration of the AC electric motor from star configuration to delta configuration. Thereby, current spikes within the windings are reduced.

In some example embodiments, the set of electrical switches consists of five or six one-way switches or three two-way switches.

In some example embodiments, the method further comprises shifting the stator winding configuration of the AC electric motor to star configuration when the rotational speed synchronisation of the first and second transmission components is accomplished.

In some example embodiments, the control unit of the electrical powertrain system described above may additionally be configured for checking current stator winding configuration, and performing said shifting of the stator winding configuration of the AC electric motor to delta configuration when the current stator winding configuration is star configuration, and remaining in delta configuration when the current stator winding configuration is in delta configuration.

Moreover, in some example embodiments, the control unit is configured for controlling the AC electric motor in a scalar control mode during the rotational speed synchronisation of the first and second transmission components. This provides a simple and fast control mode that may be instantaneously initiated.

Furthermore, in some example embodiments, the control unit is configured for controlling the AC electric motor is controlled in a vector control mode before and after the rotational speed synchronisation of the first and second transmission components. This provides an efficient and accurate control method of the AC electric motor.

The disclosure also relates to a vehicle comprising the electrical powertrain system as described above.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

This disclosure relates to a method for performing rotational speed synchronisation using a three-phase electrical motor that may be selectively operated in star and delta configuration. Thereby, it is possible to further reduce the synchronisation time period.

Figure 1:
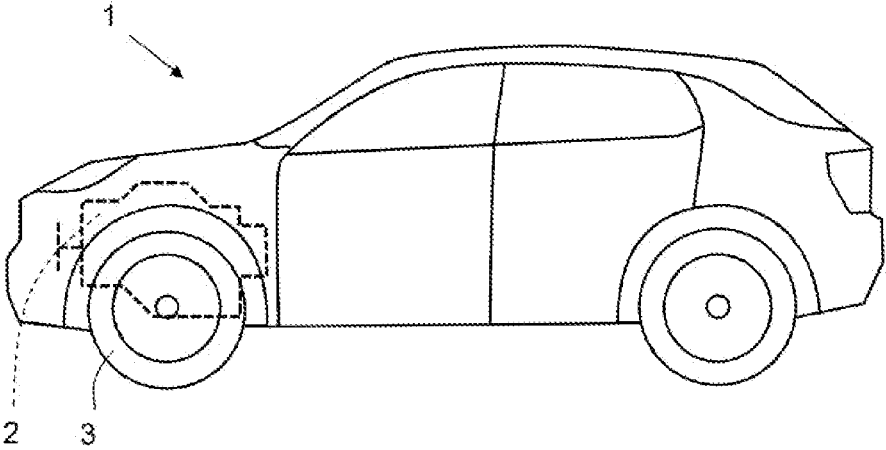
FIG. 1 shows schematically a vehicle having a transmission.

For describing the method in a context, reference is first made to FIG. 1, which shows an example embodiment of a car 1 having propulsion power source 2, such as internal combustion engine and/or an electric motor, drivingly connected with driving wheels 3 of the car via a multi-gear transmission, i.e. a transmission with a plurality of discrete gears, wherein each gear has a unique gear ratio. Clearly, the method according to the disclosure is not limited to a transmission for a front wheel driven car, or even a car at all, but may advantageously be implemented in many other types of multi-step transmissions and in many other types of applications.

Figure 2A:
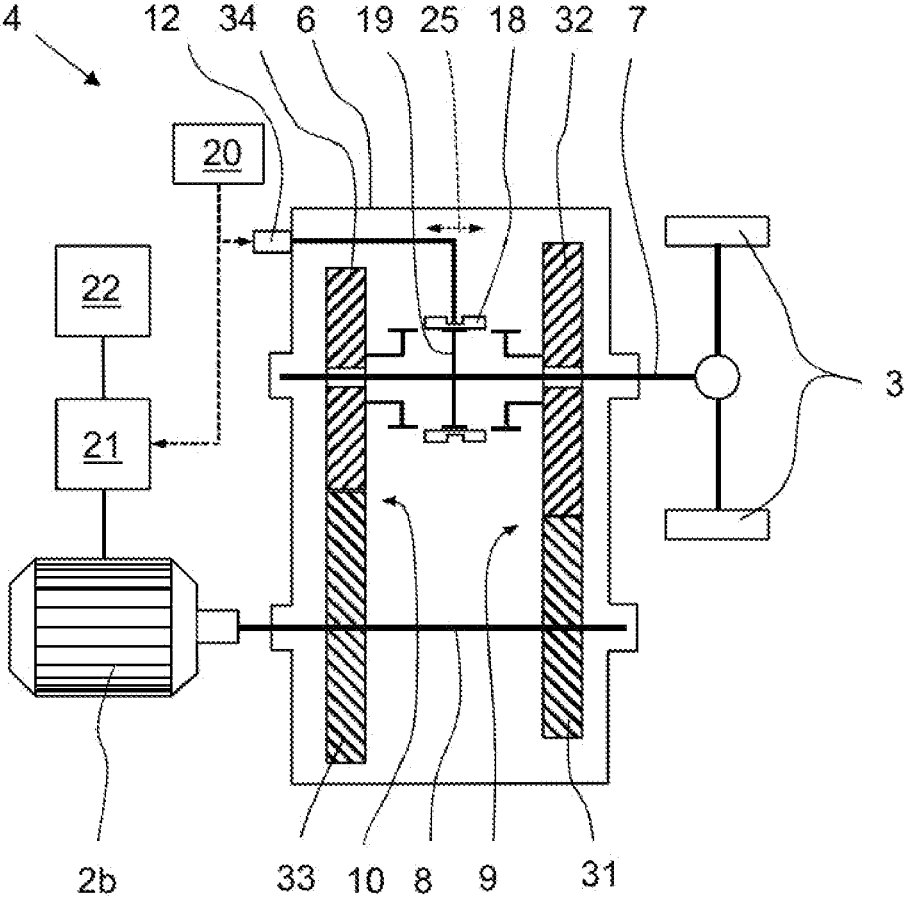
FIGS. 2A-2B show schematically two different example embodiments of a drive train including a transmission.

FIG. 2A shows a schematic illustration of a two-gear transmission 6 of a drive train 4 of automated manual transmission ATM. The drive train comprises an electric motor 2b as propulsion source, a transmission 6 and a set of driving wheel 3. The transmission according to this example embodiment has a main drive shaft 7, an input drive shaft 8, a constant mesh first gear 9 having a first gear ratio, a constant mesh second gear 10 having a second gear ratio.

The first gear 9 includes a first gear 31 rotationally secured to the input shaft 8 and in constant mesh with a freewheeling second gear wheel 32 arranged on, and rotatable relative to, said main shaft 7, and the second gear 10 includes a third gear 33 that is rotationally secured to the input shaft 8 and in constant mesh with a freewheeling fourth gear wheel 34 that is arranged on, and rotatable relative to, said main shaft 7.

An axially displaceable shift sleeve 18 arranged on and rotationally secured to the main shaft 7 via a hub 19 comprises a set of sleeve teeth, also referred to as dog teeth or simply dogs, which may be axially shifted by in both directions along a shift direction 25 by means of a shifting actuator 12 for engaging corresponding teeth, dog teeth or simply dogs of any of the associated second and fourth gear wheels 32, 34 of the first and second constant mesh gears 9, 10, for selectively changing the total gear ratio between the input shaft 8 and main shaft 7.

Freewheeling gear wheel herein refers to a gear wheel that is rotatable relative to the shaft on which it is located, and that may become rotationally locked to the shaft via the shift sleeve 18.

An electronic controller 20, such as a transmission controller, is provided for controlling operation of the transmission 6, in particular operation of the shifting actuator 12. The same controller 20 may, as illustrated in FIG. 2A, also be arranged to control operation of an electric power converter 21, such as for example an inverter, that is arranged for controlling the voltage and current supplied from a high-voltage battery 22 to the electric motor 2b. Alternatively, a more distributed system may be used for control of the power source 2b, wherein an individual electronic controller is provided for control of the transmission 6 and a further individual electronic controller is provided for control of the electric power converter 21.

Clearly, the illustrated two-gear transmission is purely one example of many possible and alternative layouts, and the method and system of the disclosure is applicable to many other types of transmissions, such as for example three-gear up to but not limited to nine-gear transmissions, or even for example up to 25-gear transmissions, and the transmission may for example be a conventional and hybrid Dual Clutch Transmissions (DCT and DCTH) or Automated Manual Transmissions (AMT).

Figure 2B:
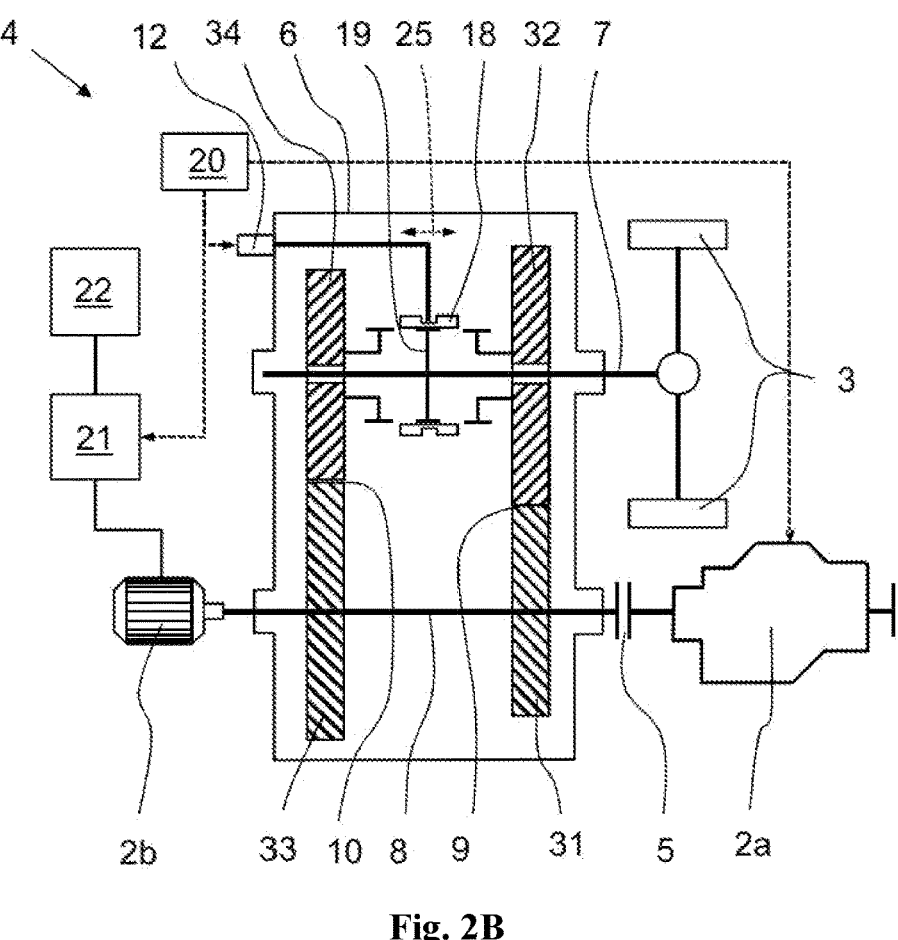

The transmission may also be implemented in many different types of drive trains, such as a hybrid power trains as schematically illustrated in FIG. 2B having both a combustion engine 2a and an electrical motor 2b as power sources for vehicle propulsion. In such case, a friction clutch 5 may be provided for enabling selective pure electric drive mode.

To conclude, the method for performing the rotational synchronisation according to the disclosure is not limited to a vehicle transmission any may advantageously or alternatively be implemented or used in other types of transmissions.

The high-level gear shifting process of a multi-step transmission can for example be divided into following phases:
1. Torque ramp down
2. Sleeve to Neutral
3. Speed Synchronization
4. Sleeve to Gear Engagement
5. Torque Ramp up.

Figure 3A:
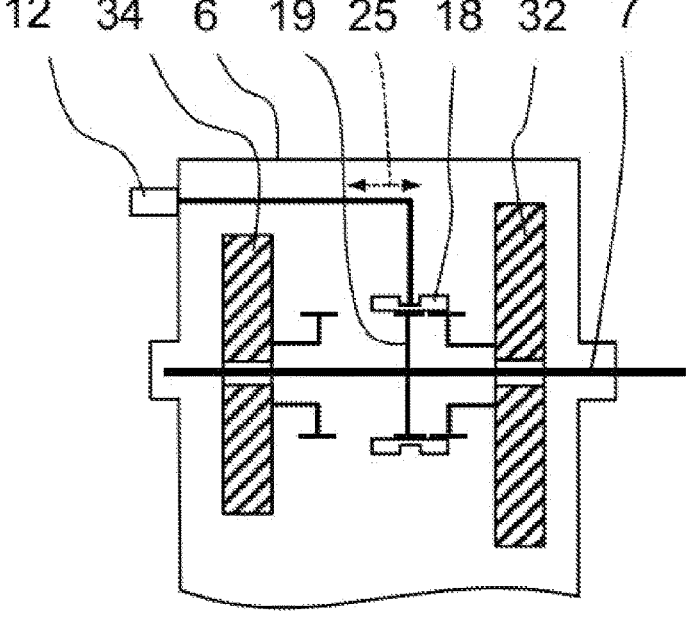
FIGS. 3A-3C show schematically a sequence of disengagement, neutral and engagement of a gears in a transmission.
Figure 3B:
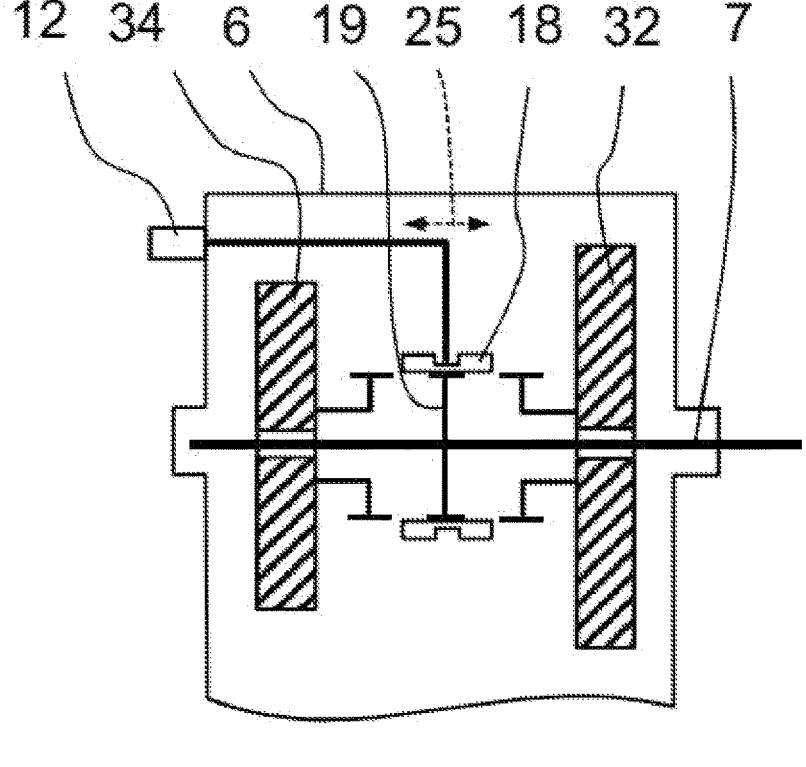
Figure 3C:
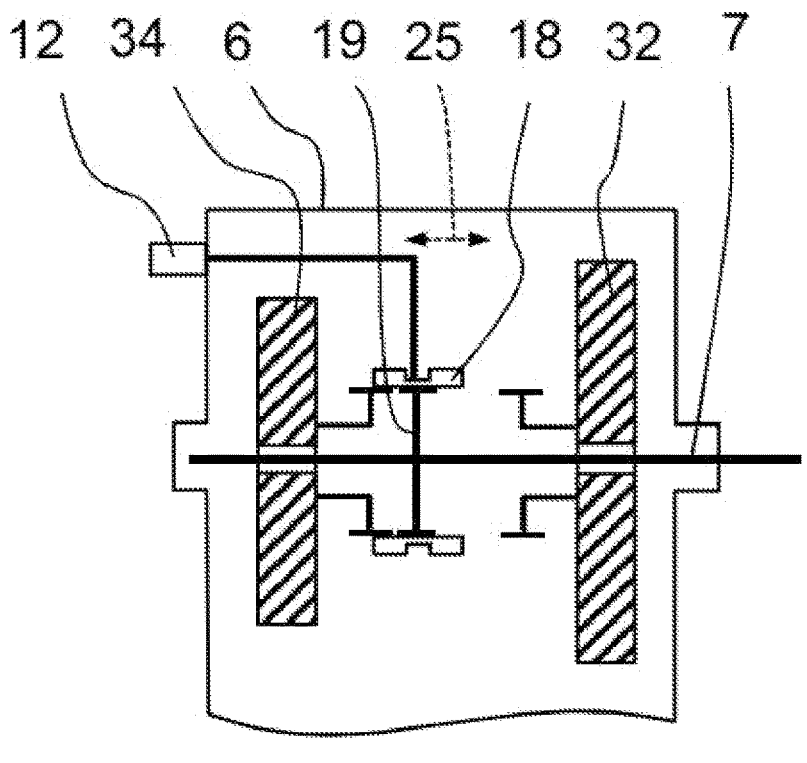

FIGS. 3A-3C illustrate a gear upshift of the schematic example transmission of FIGS. 2A-2B. For simplicity, FIGS. 3A-3C illustrate only part of the transmission of FIGS. 2A-2B, wherein FIG. 3A shows the transmission with the first gear 9 engaged, i.e. with the shift sleeve 18 in torque transfer connection with freewheeling second gear wheel 32 and the main shaft 7.

FIG. 3B shows the transmission in a state when the shift sleeve 18 has moved axially to a neutral state, i.e. a state in which the shift sleeve 18 is disconnected from both the freewheeling second and fourth gears 32, 34. Since both freewheeling second and fourth gears 32, 34 are mutually rotationally via first and third gear wheels 31, 33 and the input shaft 8, as shown in FIGS. 2A-2B, the freewheeling fourth gear wheel 34 of the second gear 10 has a higher rotational speed than the freewheeling second gear wheel 34 of the second gear 9, due to the different gear ratio of the first and second gears 9, 10. Consequently, the rotational speed of the freewheeling fourth gear wheel 34 must be decreased before the shift sleeve 18 can engage with the fourth gear wheel 34. This process, in which the rotational speed of the fourth gear wheel 34 becomes synchronised, i.e. the rotational speed is adjusted to be the same as the rotational speed of the shift sleeve, is referred to as the rotational speed synchronisation, or simply synchronisation.

In fact, axial displacement of the shift sleeve 18 for rotational connection between the first and second transmission components, at the end of said rotational speed synchronisation, may be performed with an appropriate relative rotational speed suitable for enabling mutual rotational connection. Hence, the relative rotational speed may be zero, or close to zero.

The synchronisation is performed by applying a synchronisation torque to the fourth gear wheel 34, typically indirectly via another transmission component that is rotationally connected to the fourth gear wheel 34, such as a shaft or a constant mesh gear wheel. In the example transmission of FIG. 2A, the synchronisation torque is supplied by the electric motor 2b to the input shaft 8, and further to the first and third gear wheels 31, 33, and finally further to the second and fourth gears 32, 34.

When the rotational synchronisation speed has been reached, i.e. when the shift sleeve 18 and the fourth gear wheel 34 rotates with approximately the same speed, the shift sleeve 18 is displaced axially, such that dog clutch teeth of the shift sleeve 18 may enter in the recesses located between neighbouring dog teeth of the fourth gear wheel 34, thereby providing a torque transfer connection between the fourth gear wheel 34 and the main shaft 7.

FIG. 3C shows the transmission with the second gear 10 engaged, i.e. with the shift sleeve 18 in torque transfer connection with freewheeling fourth gear wheel 34 and the main shaft 7.

Figure 4:
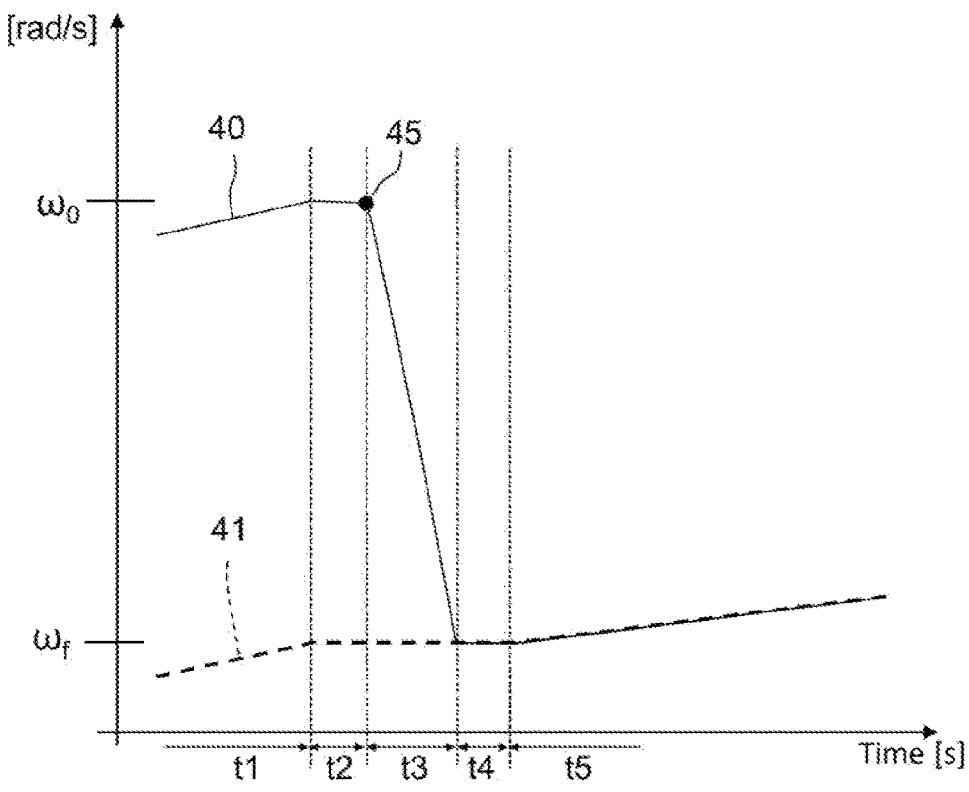
FIG. 4 shows schematically the rotational speed profile of a gear during a synchronisation process for an upshift.

FIG. 4 shows a graph having time (seconds) on the X-axis and rotational speed (radians/seconds) on the Y-axis, a first plotted line 40 illustrating a schematic example of a rotational speed of the oncoming fourth gear wheel 32 to be synchronised during the upshift, and a second plotted line 41 illustrating rotational speed of the shift sleeve 18 during said upshift.

In particular, during time period t1, the first gear 9 is still engaged, the power source provides propulsion torque and the rotational speed of both the shift sleeve 18 and second gear wheel 32 increases, thereby resulting in vehicle acceleration.

At the end of time period t1, the transmission controller initiates a gearshift to the second gear 10. Therefore, during the following second time period t2, the propulsion torque is first cancelled and the first gear 9 is subsequently disengaged by moving the shift sleeve 18 axially away from the second gear wheel 32, so that the dog teeth of the shift sleeve and dog teeth of the second gear wheel 32 disengage.

At this time point, the rotational speed 41 of the shift sleeve 18 is still the same as the rotational speed of the second gear wheel 32, and the rotational speed 40 of the oncoming fourth gear wheel 34 is higher, as shown in FIG. 4.

However, during the following third time period t3, also referred to as the synchronisation period, a synchronisation torque is applied to the fourth gear wheel 34, such that the rotational speed 40 of the oncoming fourth gear wheel 34 rapidly decreases. The synchronisation torque is applied via the electric motor 2b shown in FIGS. 2A and 2B.

At end of the third time period t3, the rotational speed 40 of the fourth gear wheel 34 has reached the rotational speed 41 of the shift sleeve 18, and during the fourth time period t4, the shift sleeve is moved axially to become rotationally connected and engaged with the fourth gear wheel 34, and the propulsion torque may be ramped up, such that the vehicle may continue the acceleration during the subsequent fifth time period t5.

Figure 5:
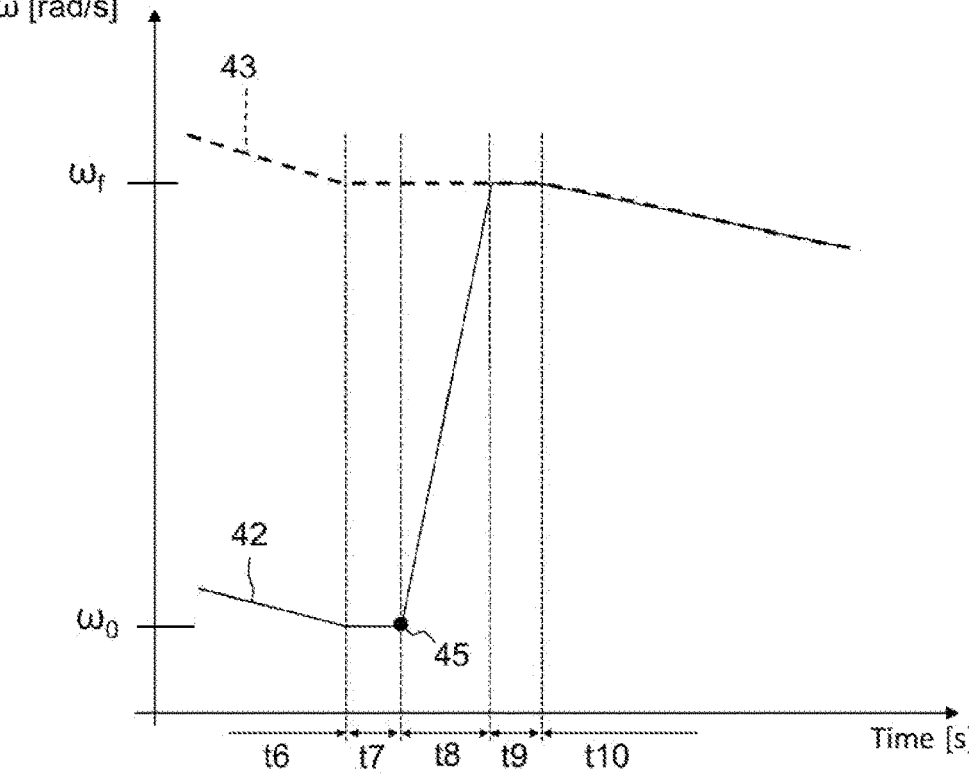
FIG. 5 shows schematically the rotational speed profile of a gear during a synchronisation process for a downshift.

Moreover, FIG. 5 shows a corresponding graph including a plotted first line 42 illustrating a schematic example of a rotational speed of the oncoming second gear wheel 32 to be synchronised during an downshift, and a second plotted line 43 illustrating rotational speed of the shift sleeve 18 during said downshift.

In particular, during the first time period t6, the second gear 10 is still engaged, no propulsion torque is provided and the rotational speed of both the shift sleeve 18 and fourth gear wheel 34 decreases, thereby resulting in vehicle deceleration.

At the end of the first time period t6, the transmission controller 20 initiates a gear downshift to the first gear 9. Therefore, during the following second time period t7, the second gear 10 is disengaged by moving the shift sleeve axially, so that the dog teeth of the shift sleeve 18 and fourth gear wheel 34 disengage.

At this time point, the rotational speed 43 of the shift sleeve 18 is still the same as the rotational speed of rotational speed of fourth gear wheel 34, and the rotational speed 42 of the oncoming second gear wheel 32 is lower, as shown in FIG. 5.

However, during the following third time period t8, a synchronisation torque is applied to the second gear wheel 32, such that the rotational speed of the oncoming second gear wheel 32 rapidly increases. The synchronisation torque is applied via the electric motor 2b shown in FIGS. 2A and 2B.

At end of the third time period t8, the rotational speed 42 of the second gear wheel 32 has reached the rotational speed 43 of the shift sleeve 18. The transmission controller 20 may preferably be arranged to control the synchronisation process during the third time period t8, including the starting point of the third time period t8, such that the relative rotational position of the shift sleeve 18 and second gear wheel 32 at the end of the third time period t8 enables immediate axial shift motion of the shift sleeve 18 without interference between dog teeth of the shift sleeve 18 and corresponding dog teeth of the second gear wheel 32.

During the fourth time period t9, the shift sleeve 18 is moved axially to become rotationally connected and engaged with the second gear wheel 32, and the vehicle may continue the decelerating during the subsequent fifth time period t10.

Figures 6, 7:
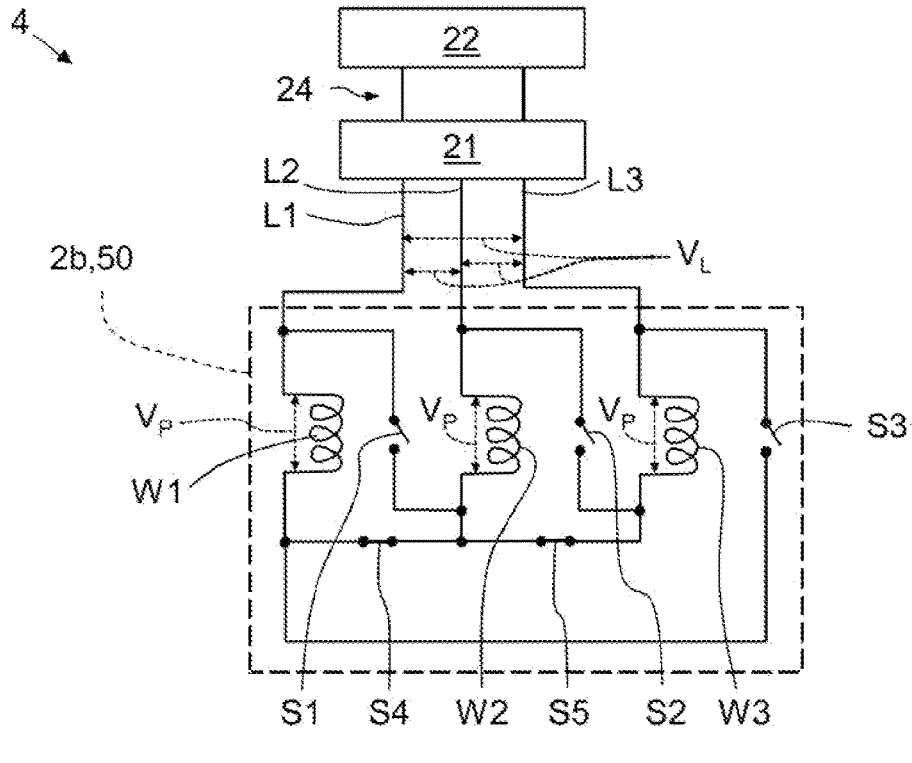
FIG. 6 shows schematically the stator windings set in star configuration.
FIG. 7 shows schematically the stator windings set in delta configuration.

With reference to FIG. 6, which schematically shows an example embodiment of the electrical portion of the drive train 4 of FIG. 2A including the high-voltage battery 22 connected via a DC link 24 to the power converter 21 in form of an inverter, three windings W1, W2, W3 of a three-phase AC electrical motor 2b, such as an induction motor or a permanent magnet synchronous motor, and a switching mechanism 50 enabling the stator windings W1-W3 of the AC electric motor 2b to be selectively connected in star configuration or delta configuration.

Each winding W1-W3 has a first terminal and a second terminal. Three phases L1, L2, L3 exit the inverter 21 and are each connected to one of the first terminals of the windings W1-W3.

The switching mechanism 50 comprises a first set of switches including a first, second and a one-way third switch S1, S2, S3, wherein the first switch S1 enables connection of the first terminal of the first winding W1 with the second terminal of the second winding W2 when being set in a closed state, wherein the second switch S2 enables connection of the first terminal of the second winding W2 with the second terminal of the third winding W3 when being set in a closed state, and wherein the third switch S3 enables connection of the first terminal of the third winding W3 with the second terminal of the first winding W1 when being set in a closed state.

The switching mechanism 50 further comprises a second set of switches including a fourth and a fifth one-way switch S4, S5, which jointly enables connection of the second terminals of all three windings W1-W3 when being set in a closed state.

Consequently, when the first set of switches S1-S3 are set in an open state, and the second set of switches S4-S5 are set in a closed state, the stator windings W1-W3 of the AC electric motor 2b are connected in star configuration, as illustrated in FIG. 6.

Similarly, when the first set of switches S1-S3 are set in a closed state, and the second set of switches S4-S5 are set in an open state, the stator windings W1-W3 of the AC electric motor 2b are connected in delta configuration, as illustrated in FIG. 7.

Figure 8:
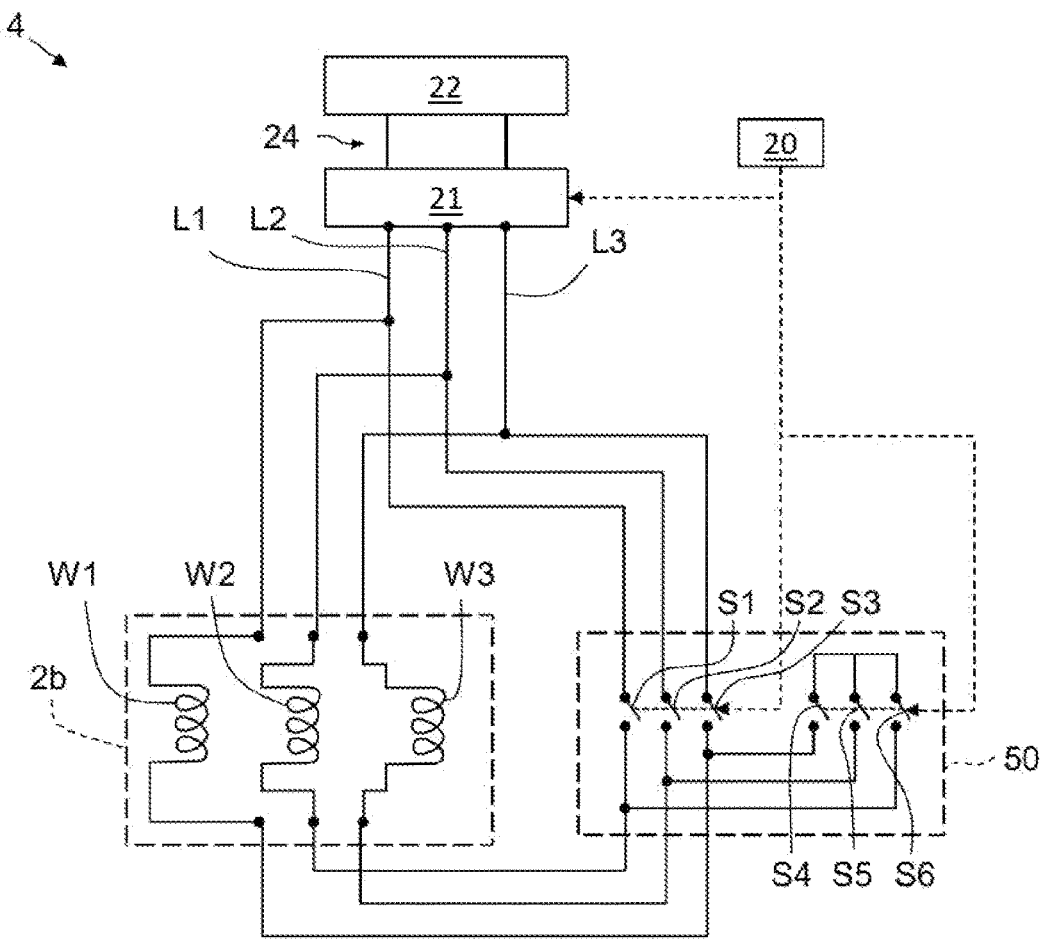
FIG. 8 shows schematically a further example embodiment of the powertrain with remote switching mechanism.

The switching mechanism 50 may be integrated with the electric motor 2b or arranged remote from the electric motor 2b. For example, FIG. 8 schematically illustrates a further example embodiment of the electrical part of the drive train 4, in which the switching mechanism 50 is arranged remote from the electrical motor 2b. Moreover, in this example embodiment, the second set of switches include three individual ne-way switches S4-S6 that jointly enables connection of the second terminals of all three windings W1-W3 when being set in a closed state.

Figure 9:
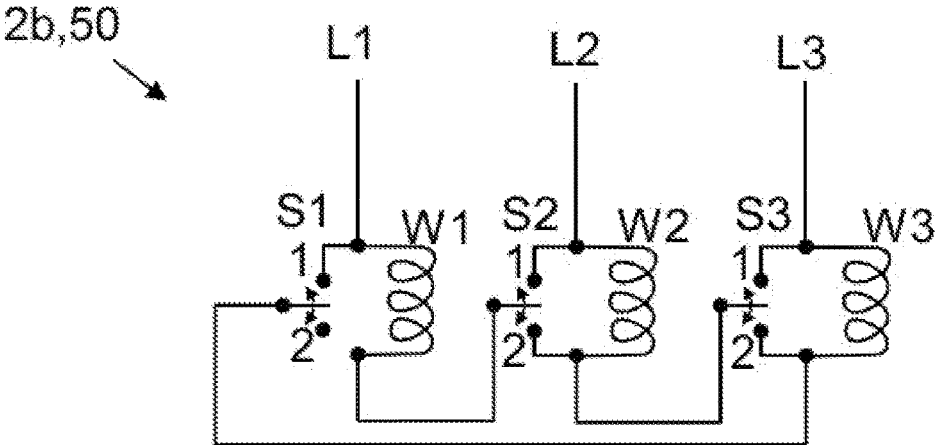
FIG. 9 shows schematically still an example embodiment of the switching mechanism.

According to still a further example embodiment of the switching mechanism 50, as described with reference to FIG. 9, the switching mechanism 50 comprises three two-way switches S1, S2, S3, each having three poles and two switch states 1, 2. When each of the switches S1, S2, S3 are set in the first state 1, the stator windings W1-W3 of the AC electric motor 2b are connected in delta configuration, and when each of the switches S1, S2, S3 are set in the second state 2, the stator windings W1-W3 of the AC electric motor 2b are connected in star configuration.

Consequently, the method and system according to the disclosure may comprise: providing the switching mechanism with a set of electrical switches S1-S6 for enabling the stator windings W1-W3 of the AC electric motor 2b to be selectively connected in star or delta configuration, and shifting all switches S1-S6 of said set substantially simultaneously when shifting the stator winding configuration of the AC electric motor 2b from star configuration to delta configuration.

Moreover, as described above, the set of electrical switches S1-S6 consist for example of five or six one-way switches or three two-way switches, or the like.

In addition, it may be advantageous to coordinate the operation of the switching mechanism 50 for shifting the stator winding configuration of the AC electric motor 2b from star configuration to delta configuration with the operating point of the AC electric motor 2b for ensuring discharge of the phase inductor voltage of the AC electric motor 2b before triggering said operation of the switching mechanism 50. Immediately after stopping supply of electrical energy from the inverter 21 to the electrical motor 2b, the phase voltage $V_P$ will quickly decay as the inductor voltage of the windings of the electric motor becomes discharged, for example via flyback diodes in the inverter.

A first example embodiment of the method for performing rotational speed synchronisation is described below with reference to FIG. 10A and any of FIG. 2A or 2B, wherein for example a gearshift from the first gear 9 to the second gear 10 is performed, or opposite.

The method relates to rotational speed synchronisation of a first transmission component 32, 34 having a first initial rotational speed with a second transmission component 18 having a second initial rotational speed, by means of a three-phase AC electric motor 2b that is rotationally connected to the first transmission component 32, 34, during a gear switch in a stepped gear transmission 6 of a drive train 4 having a switching mechanism 50 enabling the stator windings W1-W3 of the AC electric motor to be selectively connected in star configuration or delta configuration.

Specifically, the method comprises a first step S10 of obtaining a command, or determining, that a gear switch should be performed. The method further comprises a second step S20 of shifting the stator winding configuration of the AC electric motor 2b to delta configuration, or ensuring that the stator winding configuration of the AC electric motor 2b is in delta configuration. Finally, the method comprises a third step S30 of controlling operation of the AC electric motor 2b for accomplishing rotational speed synchronisation of the first and second transmission components 32, 34.

In other words, the second step S20 thus involves controlling the stator winding configuration of the AC electric motor 2b to be in delta configuration.

A first example embodiment of the electrical powertrain 4 for a vehicle is described below with reference to any of FIG. 2A or 2B and FIG. 8. Specifically, the electrical powertrain system comprises an electrical storage system 22, an inverter 21, a three phase AC electric propulsion motor 2b drivingly connected to a wheel 3 of the vehicle via a stepped gear transmission 6 having a first transmission component 32, 34 and a second transmission component 18, wherein the AC electric motor 2b is rotationally connected to the first transmission component 32, 34.

The electrical powertrain system further comprises a switching mechanism 50 with a set of electrical switches S1-S6 for enabling the stator windings W1-W3 of the AC electric motor 2b to be selectively connected in star or delta configuration, and a control unit 20 for controlling operation of the switching mechanism 50, wherein the control unit 20 is configured for: obtaining a command, or determining, that a gear switch should be performed; shifting the stator winding configuration of the AC electric motor 2b to delta configuration, or ensuring that the stator winding configuration of the AC electric motor 2b is in delta configuration; and subsequently controlling operation of the AC electric motor 2b for accomplishing rotational speed synchronisation of the first and second transmission components 32, 24, 18.

It is known from for example document U.S. Pat. No. 5,675,222 that the electric motor with switchable windings can be operated in star connection at a lower speed of travel, and in a delta connection at a higher speed of travel, for utilising the higher torque available a star connection and the higher maximum rotational speed available in delta connection.

However, it was hereto unknown that delta connection advantageously can be used also during the synchronisation phase for enabling faster synchronisation time.

Figure 11:
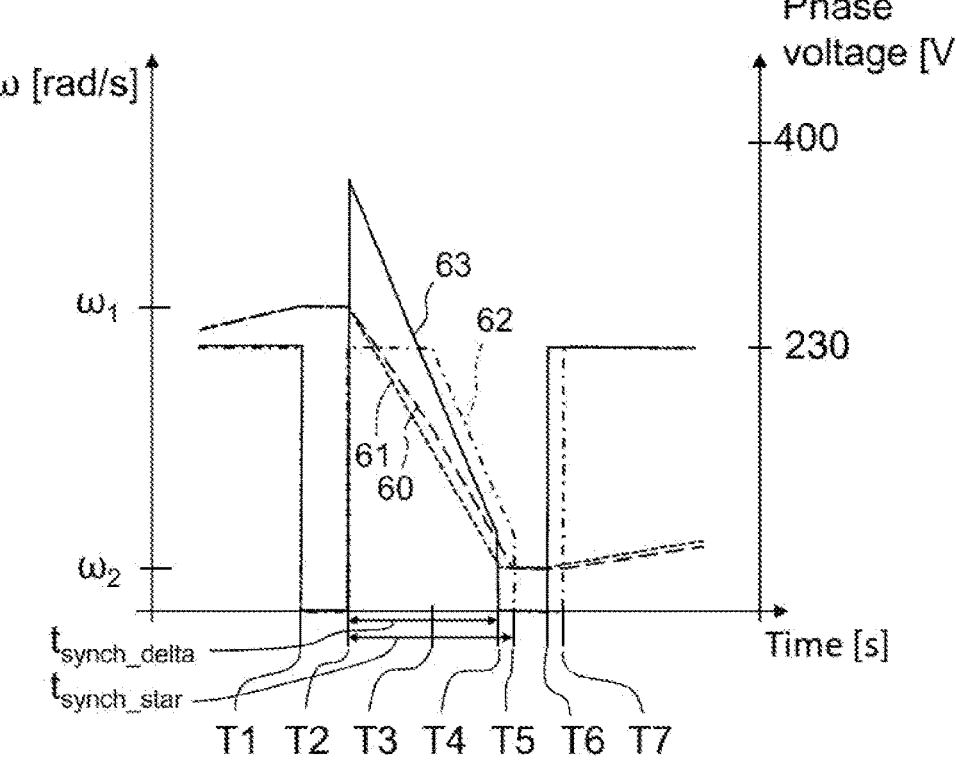
FIG. 11 shows schematically speed and phase voltage during a gear upshift.
Figure 12:
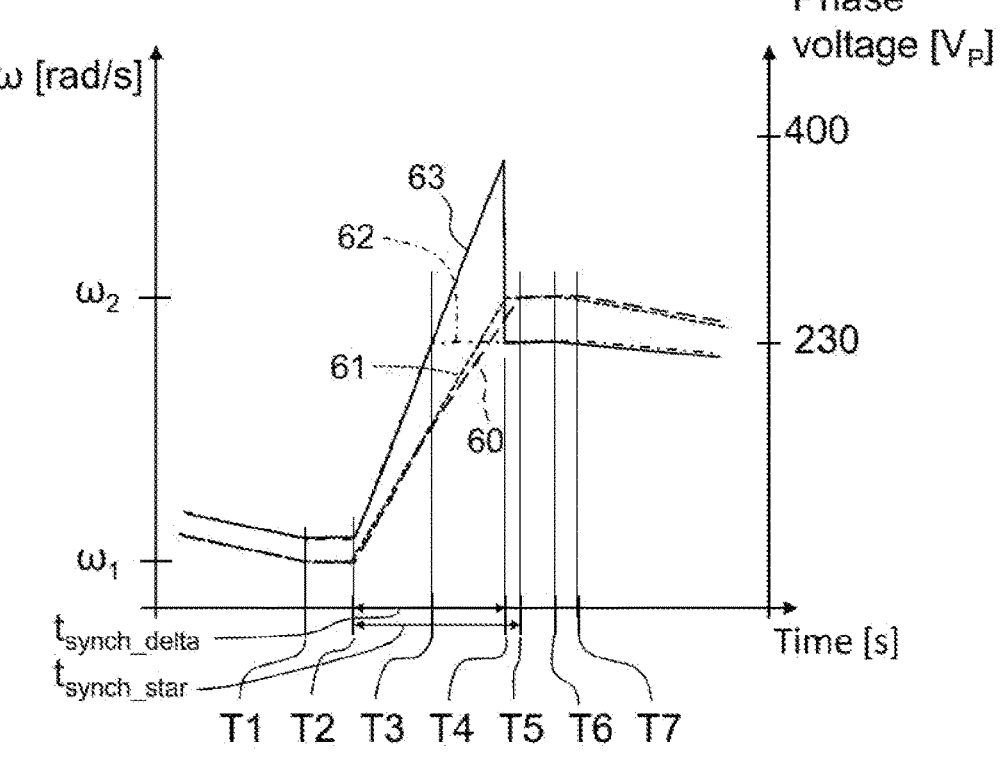
FIG. 12 shows schematically speed and phase voltage during a gear downshift.

The advantage of performing the rotational speed synchronisation during an upshift and a down shift while having the stator winding configuration of the AC electric motor 2b set in delta configuration is described below with reference to FIGS. 11 and 12, respectively. FIG. 11 shows a graph illustrating an upshift similar to that of FIG. 4, and FIG. 12 shows a graph illustrating a downshift similar to that of FIG. 5.

Moreover, for illustrating the advantage of delta connection during synchronisation phase, the rotational speed of an oncoming gear, such as for example the fourth gear wheel 32, is illustrated both when star connection is used during the entire gear-shift sequence, thus symbolising prior art solution, as well as the rotational speed of the same oncoming gear when delta connection is used during the synchronisation phase of the gear-shift sequence.

Consequently, FIG. 11 shows a long-dashed line 60 illustrating rotational speed of an oncoming gear during the upshift when star connection is used during the entire gear-shift sequence. FIG. 11 further shows a short-dashed line 61 illustrating rotational speed of an oncoming gear during the upshift when delta connection is used during the synchronisation phase $t_{synch\_delta}$ of the gear-shift sequence, and star connection is used before and after said synchronisation phase $t_{synch\_delta}$.

In addition, FIG. 11 shows a dashed-dotted line 62 illustrating the phase voltage, i.e. the voltage level across each of the windings W1-W3, when star connection is used during the entire gear-shift sequence. Finally, FIG. 11 shows a solid line 63 illustrating the phase voltage when delta connection is used during the synchronisation phase $t_{synch\_delta}$ of the gear-shift sequence, and star connection is used before and after said synchronisation phase $t_{synch\_delta}$.

In other words, the rotational speed 60, 61 of an oncoming gear and associated phase voltage 62, 63 of two different systems are both included in FIG. 11 for illustrating the difference between said two systems in terms of gear shift time.

First, rotational speed 60 of oncoming gear and associated phase voltage 62 when star connection is used during the entire gear-shift sequence is discussed. During the time before time point T1, the first gear 9 is still engaged, the electric provides propulsion torque and the rotational speed of both the shift sleeve 18 and second gear wheel 32 increases, thereby resulting in vehicle acceleration.

The maximal phase voltage is for example 230 V, stemming from a maximal supply voltage of for example 400 V from the inverter, wherein phase voltage $V_P$ equals:

$$V_P = \frac{V_L}{\sqrt{3}},$$

wherein $V_L$ is line voltage, i.e. voltage level across supply lines L1-L3.

Phase voltage $V_P$, and line voltage $V_L$, are depicted in FIG. 6.

At time point T1, the transmission controller initiates a gearshift to the second gear 10. Therefore, the propulsion torque is cancelled and the first gear 9 is subsequently disengaged by moving the shift sleeve 18 axially away from the second gear wheel 32, so that the dog teeth of the shift sleeve and dog teeth of the second gear wheel 32 disengage. During the time between T1 and T2, the inverter switches remain open and the phase voltage is thus zero.

At time point T2, the rotational synchronisation of the fourth gear 34 is initiated for reducing the rotational speed 60 of the fourth gear 34 from ω1 to the rotational speed ω2 of the shift sleeve 18.

A scalar voltage control is applied during the synchronisation time phase $t_{synch\_star}$. This type of control typically involves controlling rotational speed of electric motor by varying the frequency of the AC supply voltage, and wherein the relationship between voltage "V" and frequency "f" are kept constant through the motor speed range, i.e. a constant V/f ratio, for providing a constant and desired level of a stator flux linkage. The frequency "f" is set according to the wanted rotational speed and the magnitude of the voltage "V" is adjusted to keep the ratio between them constant. The method typically uses an open-loop control approach without any feedback of motor parameters or its rotational position.

However, at time point T2, the rotational speed of the oncoming fourth gear 34 is relatively high, but since the phase voltage $V_P$ cannot be increased beyond 230 V, the desired V/f ratio cannot be provided due to the stator voltages limitation at the rated value. In other words, the electric motor operates in the field-weakening region until time point T3, when the desired V/f ratio can be provided. During operation in the field-weakening region between time points T2 to T3, the phase voltage $V_P$ remains 230 V.

However, from time point T3 to T5, the phase voltage $V_P$ is gradually reduced along with reduced frequency "f", i.e. rotational speed of electric motor 2b, for keeping constant and desired V/f ratio.

At time T5, the rotational speed 60 of the oncoming gear is synchronised with the rotational speed of the shift sleeve 18, thereby enabling axial motion of the shift sleeve to become rotationally connected and engaged with the fourth gear wheel 34.

During the time between T5 and T7, the inverter switches remain open and the phase voltage is thus zero.

At time point T7, the engagement is completed and the propulsion torque may be ramped up, such that the vehicle may continue the acceleration.

Now, for comparison, the rotational speed 61 of oncoming gear and associated phase voltage 63 when delta connection is used during the synchronisation phase, i.e. between time point T2-T4, is discussed. During the time before time point T1, the first gear 9 is still engaged, the electric motor 2b is star connected and provides propulsion torque and the rotational speed of both the shift sleeve 18 and second gear wheel 32 increases, thereby resulting in vehicle acceleration.

The maximal phase voltage is for example 230 V, stemming from a maximal supply voltage of for example 400 V from the inverter.

At time point T1, the transmission controller initiates a gearshift, as described above. Hence, the propulsion torque is cancelled, the first gear 9 is subsequently disengaged and during the time between T1 and T2, the inverter switches remain open and the phase voltage is thus zero.

Moreover, the switching mechanism 50 is activated for shifting the stator winding configuration from star to delta winding. As a result, maximal phase voltage is for example 400 V, stemming from a supply voltage of for example 400 V from the inverter, wherein phase voltage $V_P$ equals line voltage $V_L$ during delta connection.

At time point T2, the rotational synchronisation of the fourth gear 34 is initiated for reducing the rotational speed 61 of the fourth gear 34 from ω1 to the rotational speed ω2 of the shift sleeve 18.

As described above, the AC electric motor is controlled in a scalar control mode during the rotational speed synchronisation of the first and second transmission components, i.e. during the synchronisation time phase $t_{synch\_delta}$, and due to the increased maximal voltage level in delta connection, the desired V/f ratio can be provided during the entire synchronisation phase from time point T2 to T4. In other words, the electric motor 2b does not operate in the field-weakening region during the synchronisation period. Instead, during the entire synchronisation phase extending from time point T2 to T4, the phase voltage $V_P$ is gradually reduced along with reduced frequency "f" for keeping a constant and desired V/f ratio.

As illustrated by the different inclination of the rotational speed 60, 61 of the oncoming gear wheel, the rotational acceleration provided by the delta connection is higher that star connection, because the delta connected stator windings does not enter the field-weakening region, and may keep an optimal V/f ratio, contrary to the star connected windings.

The synchronisation time period $t_{synch\_delta}$, which extends between time points T2-T4 is smaller than synchronisation time period $t_{synch\_star}$, which extends between time points T2-T5. In other words, the overall gear shift may be performed faster when the electric motor is shifted from star connection to delta connection during the synchronisation period.

The AC electric motor is controlled in a vector control mode before and after the rotational speed synchronisation of the first and second transmission components.

The advantage of delta connection during synchronisation in a downshift sequence is described below with reference to FIG. 12, which corresponds to a downshift during vehicle coasting, i.e. during vehicle deceleration without any accelerator or brake pedal actuation.

FIG. 12 shows a long-dashed line 60 illustrating rotational speed of an oncoming gear, such as the second gearwheel 32, during the upshift when star connection is used during the entire gear-shift sequence. FIG. 12 further shows a short-dashed line 61 illustrating rotational speed of an oncoming gear during the upshift when delta connection is used during the synchronisation phase $t_{synch\_delta}$ of the gear-shift sequence, and star connection is used before and after said synchronisation phase $t_{synch\_delta}$.

In addition, FIG. 12 shows a dashed-dotted line 62 illustrating the phase voltage when star connection is used during the entire gear-shift sequence, as well as a solid line 63 illustrating the phase voltage when delta connection is used during the synchronisation phase $t_{synch\_delta}$ of the gear-shift sequence, and star connection is used before and after said synchronisation phase $t_{synch\_delta}$.

First, rotational speed 60 of oncoming gear and associated phase voltage 62 when star connection is used during the entire gear-shift sequence is discussed. During the time before time point T1, the second gear 10 is still engaged, the inverter supplies to voltage and the back-emf of the electric motor generates a voltage level. The rotational speed of both the shift sleeve 18 and fourth gear wheel 34 decreases, corresponding to vehicle deceleration.

At time point T1, the transmission controller initiates a gear downshift, corresponding for example from the second gear 10 to the first gear 9 in the embodiment of FIG. 2A. Consequently, the shift sleeve 18 is displaced axially away from the fourth gear wheel 34, so that the dog teeth of the shift sleeve 18 and dog teeth of the fourth gear wheel 32 disengage, such that the second gear 10 becomes disengaged.

At time point T2, the rotational synchronisation of the second gear 32 is initiated for increasing the rotational speed 60 of the second gear 32 from $\omega_1$ to the rotational speed $\omega_2$ of the shift sleeve 18.

A scalar voltage control is applied during the synchronisation time phase $t_{synch\_star}$. However, when arriving at time point T3, the rotational speed of the oncoming second gear 32 is relatively high, but since the phase voltage $V_P$ cannot be increased beyond 230 V, the desired V/f ratio can no longer be maintained due to the stator voltages limitation at the rated value. In other words, the electric motor enters the field-weakening region until time point T5, when the synchronisation is finalised. During operation in the field-weakening region between time points T3 to T5, the phase voltage $V_P$ remains 230 V.

At time T5, the rotational speed 60 of the oncoming gear is synchronised with the rotational speed of the shift sleeve 18, thereby enabling axial motion of the shift sleeve to become rotationally connected and engaged with the second gear wheel 32.

At time point T7, the engagement is completed and the vehicle deceleration may continue, but not with a higher back-emf voltage generated by the electrical motor 2b.

Now, for comparison, the rotational speed 61 of oncoming gear and associated phase voltage 63 when delta connection is used during the synchronisation phase, i.e. between time points T2-T4, is discussed. During the time before time point T1, the second gear 10 is still engaged, the electric motor 2b is star connected and generates a certain back-emf voltage, and the rotational speed of both the shift sleeve 18 and fourth gear wheel 34 slowly decreases, thereby resulting in vehicle deceleration.

At time point T1, the transmission controller initiates a gear downshift, as described above. Hence, the second gear 10 is disengaged.

Moreover, the switching mechanism 50 is activated for shifting the stator winding configuration from star to delta winding. As a result, maximal phase voltage is for example 400 V, stemming from a supply voltage of for example 400 V from the inverter, wherein phase voltage $V_P$ equals line voltage $V_L$ during delta connection.

The control unit may be configured for controlling the switches of the inverter to remain in open state during operation of the switching mechanism for shifting the stator winding configuration of the AC electric motor from star configuration to delta configuration.

At time point T2, the rotational synchronisation of the second gear wheel 32 is initiated for increasing the rotational speed 61 of the second gear wheel 32 from $\omega_1$ to the rotational speed $\omega_2$ of the shift sleeve 18.

As described above, the AC electric motor is controlled in a scalar control mode during the rotational speed synchronisation of the first and second transmission components, i.e. during the synchronisation time phase $t_{synch\_delta}$, and due to the increased maximal voltage level in delta connection, the desired V/f ratio can be provided during the entire synchronisation phase from time point T2 to T4. In other words, the electric motor 2b does not operate in the field-weakening region during the synchronisation period. Instead, during the entire synchronisation phase extending from time point T2 to T4, the phase voltage $V_P$ is gradually increased along with increased frequency "f" for keeping a constant and desired V/f ratio.

As illustrated by the different inclination of the rotational speed 60, 61 of the oncoming gear wheel, the rotational acceleration provided by the delta connection is higher that star connection, because the delta connected stator windings does not enter the field-weakening region, and may keep an optimal V/f ratio, contrary to the star connected windings.

The synchronisation time period $t_{synch\_delta}$, which extends between time points T2-T4 is smaller than synchronisation time period $t_{synch\_star}$, which extends between time points T2-T5. In other words, the overall gear shift may be performed faster when the electric motor is shifted from star connection to delta connection during the synchronisation period.

The AC electric motor is controlled in a vector control mode before and after the rotational speed synchronisation of the first and second transmission components.

Figures 10A, 10B, 10C:
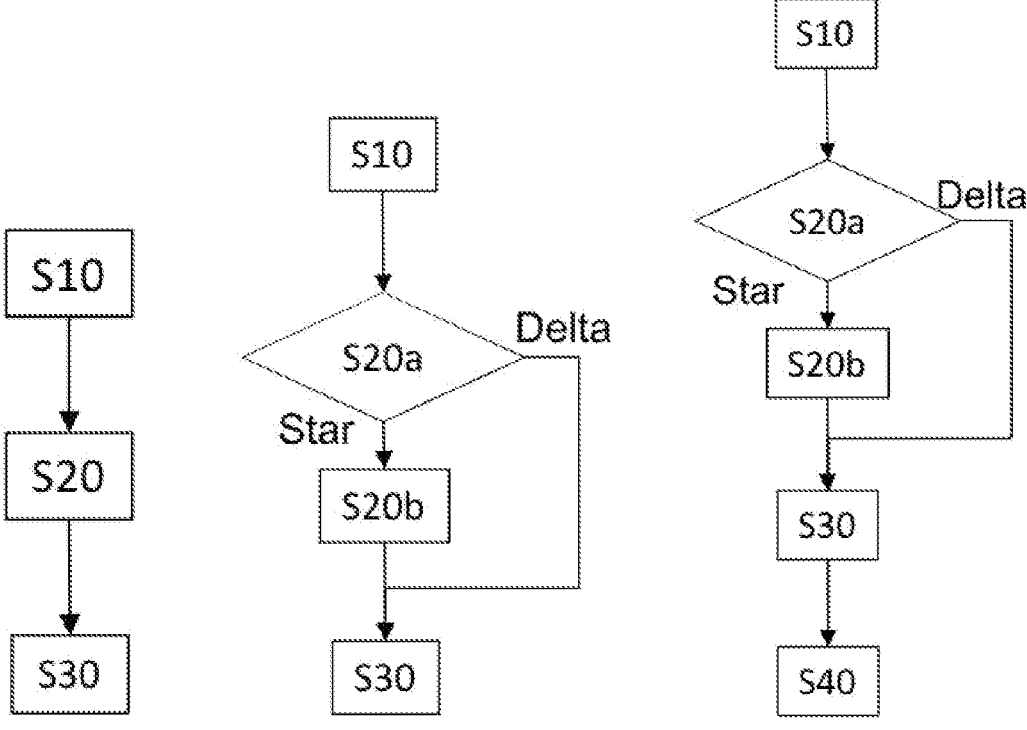
FIGS. 10A-10C show schematically three example embodiments of the method for performing the rotational synchronisation.

With reference to FIG. 10B, which shows a further example embodiment of the method, the second step S20 of shifting the stator winding configuration of the AC electric motor to delta configuration, or ensuring that the stator winding configuration of the AC electric motor is in delta configuration, may be configured to involve a first sub step S20a of checking the current stator winding configuration, and a second sub step S20b of shifting the stator winding configuration of the AC electric motor to delta configuration when the current stator winding configuration is star configuration. However, when it is concluded during the first sub step S20a that the current stator winding configuration is delta configuration, the AC electric motor 2b should remain in delta configuration, and the method this proceeds directly to the third step S30 of controlling operation of the AC electric motor 2b for accomplishing rotational speed synchronisation of the first and second transmission components 32, 34.

According to yet a further example embodiment, as schematically illustrated in FIG. 10C, the method may comprise a fourth step S40 of shifting the stator winding configuration of the AC electric motor 2b to star configuration when the rotational speed synchronisation of the first and second transmission components 32, 34 is accomplished.

Figure 13:
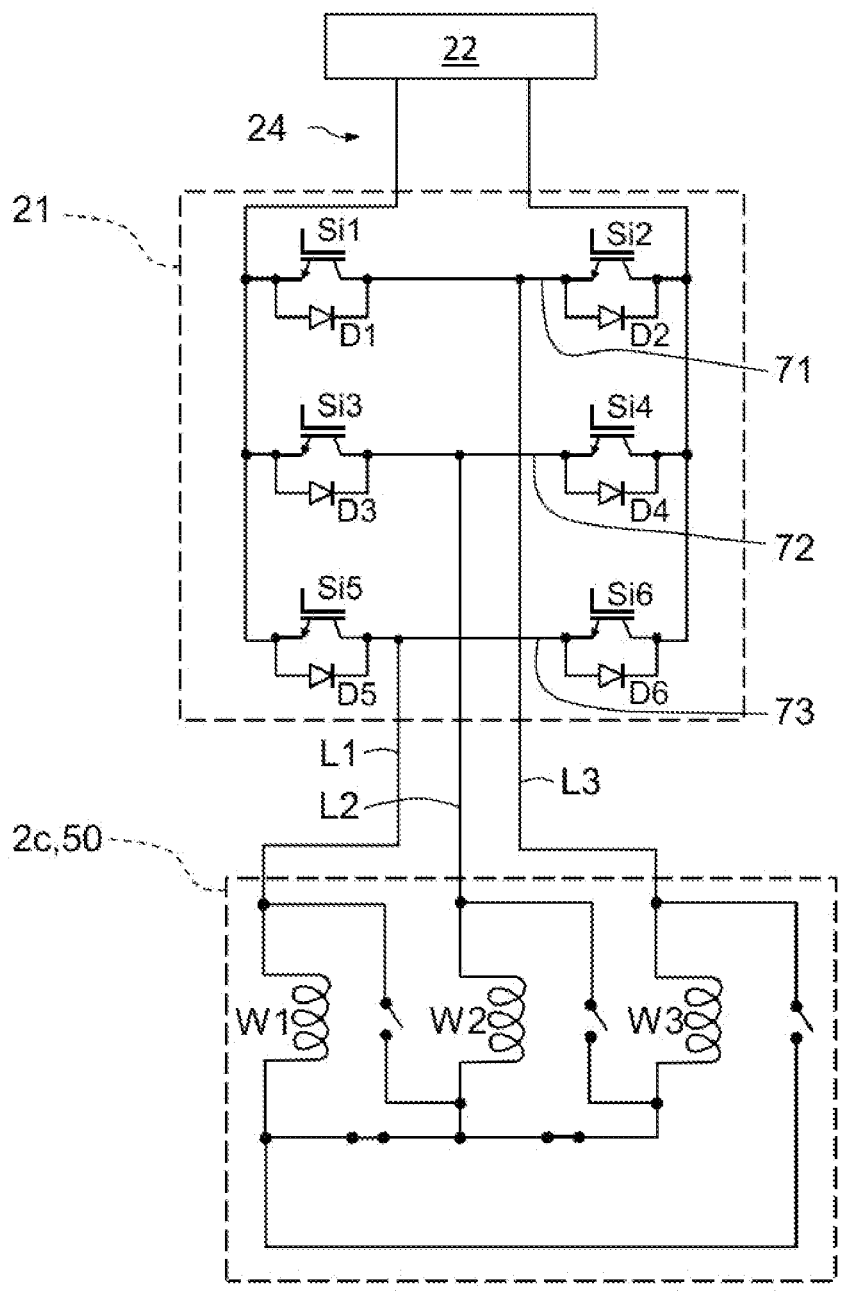
FIG. 13 shows schematically a further example embodiment of the powertrain with further details of an example embodiment of the inverter.

An example embodiment of a more detailed version of the electric part of the powertrain 4 is shown in FIG. 13. Specifically, FIG. 13 includes an example embodiment of the inverter 21, which here includes six inverter switches Si1-Si6, wherein two inverter switches Si1-Si6 are associated with of the three legs 71, 72, 73. Each switch Si1-Si6 further includes a bypass diode D1-D6 for enabling current spikes generated by inductive components to pass the switch Si1-Si6, thereby avoiding potentially damaging voltage levels.

It will be appreciated that the above description is merely exemplary in nature and is not intended to limit the present disclosure, its application or uses. For example, the invention in not limited to the example values of maximal phase voltage or line voltage supplied by inverter described herein. Moreover, while specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

What is claimed is:

1. A method for performing rotational speed synchronisation of a first transmission component having a first initial rotational speed with a second transmission component having a second initial rotational speed, by means of a three-phase AC electric motor that is rotationally connected to the first transmission component, during a gear switch in a stepped gear transmission of a drive train having a switching mechanism enabling stator windings of the AC electric motor to be selectively connected in star configuration or delta configuration, wherein the drivetrain comprises an electrical storage system, an inverter, a stepped gear transmission and three-phase AC electric motor, wherein the inverter is arranged for controlling the voltage and current supplied from electrical storage system to the three phase AC electric propulsion motor, wherein the first transmission component of the stepped gear transmission is a gear wheel, and wherein the second transmission component of the stepped gear transmission is an axially displaceable shift sleeve, the method comprising:

obtaining a command, or determining, that a gear switch should be performed, setting the stepped gear transmission in a neutral state, shifting the stator winding configuration of the AC electric motor to delta configuration, or ensuring that the stator winding configuration of the AC electric motor is in delta configuration, and controlling operation of the AC electric motor for accomplishing rotational speed synchronisation of the first and second transmission components, displacing the shift sleeve axially for providing a torque transfer connection between the first and second transmission components, shifting the stator winding configuration of the AC electric motor to star configuration when the rotational speed synchronisation of the first and second transmission components is accomplished.

2. The method according to claim 1, wherein the step of shifting the stator winding configuration of the AC electric motor to delta configuration, or ensuring that the stator winding configuration of the AC electric motor is in delta configuration involves:

checking current stator winding configuration, and shifting the stator winding configuration of the AC electric motor to delta configuration when the current stator winding configuration is star configuration, and remaining in delta configuration when the current stator winding configuration is in delta configuration.

3. The method according to claim 1, wherein the AC electric motor is controlled in a scalar control mode during the rotational speed synchronisation of the first and second transmission components.

4. The method according to claim 1, wherein the AC electric motor is controlled in a vector control mode before and after the rotational speed synchronisation of the first and second transmission components.

5. The method according to claim 1, wherein at the end of said rotational speed synchronisation, the first and second transmission components rotates with an appropriate relative rotational speed suitable for enabling mutual rotational connection.

6. The method according to claim 1, comprising:

controlling the switches of the inverter to remain in open state during operation of the switching mechanism for shifting the stator winding configuration of the AC electric motor from star configuration to delta configuration.

7. The method according to claim 1, comprising:

coordinating the operation of the switching mechanism for shifting the stator winding configuration of the AC electric motor from star configuration to delta configuration with the operating point of the AC electric motor for ensuring discharge of the phase inductor voltage of the AC electric motor before triggering said operation of the switching mechanism.

8. The method according to claim 1, comprising:

providing the switching mechanism with a set of electrical switches for enabling the stator windings of the AC electric motor to be selectively connected in star or delta configuration, and shifting all switches of said set simultaneously when shifting the stator winding configuration of the AC electric motor from star configuration to delta configuration.

9. The method according to claim 8, wherein the set of electrical switches consists of five or six one-way switches or three two-way switches.

10. An electrical powertrain system for a vehicle, the electrical powertrain system comprising:

an electrical storage system, an inverter, a three phase AC electric propulsion motor drivingly connected to a wheel of the vehicle via a stepped gear transmission having a first transmission component and a second transmission component, wherein the AC electric motor is rotationally connected to the first transmission component, wherein the first transmission component of the stepped gear transmission is a gear wheel, wherein the second transmission component of the stepped gear transmission is an axially displaceable shift sleeve, and wherein the inverter is arranged for controlling the voltage and current supplied from electrical storage system to the three phase AC electric propulsion motor, a switching mechanism with a set of electrical switches for enabling the stator windings of the AC electric motor to be selectively connected in star or delta configuration, and a control unit for controlling operation of the switching mechanism and the inverter, wherein the control unit is configured for:

obtaining a command, or determining, that a gear switch should be performed, setting the stepped gear transmission in a neutral state, shifting the stator winding configuration of the AC electric motor to delta configuration, or ensuring that the stator winding configuration of the AC electric motor is in delta configuration, controlling operation of the AC electric motor for accomplishing rotational speed synchronisation of the first and second transmission components, displacing the shift sleeve axially for providing a torque transfer connection between the first and second transmission components, and shifting the stator winding configuration of the AC electric motor to star configuration when the rotational speed synchronisation of the first and second transmission components is accomplished.

11. The electrical powertrain system for a vehicle according to claim 10, wherein the control unit is additionally configured for checking current stator winding configuration, and performing said shifting of the stator winding configuration of the AC electric motor to delta configuration when the current stator winding configuration is star configuration, and remaining in delta configuration when the current stator winding configuration is in delta configuration.

12. The electrical powertrain system for a vehicle according to claim 10, wherein the control unit is configured for controlling the AC electric motor in a scalar control mode during the rotational speed synchronisation of the first and second transmission components.

13. The electrical powertrain system for a vehicle according to claim 10, wherein the control unit is configured for controlling the AC electric motor is controlled in a vector control mode before and after the rotational speed synchronisation of the first and second transmission components.

14. A vehicle comprising the electrical powertrain system according to claim 10.

* * * * *